United States Patent Office 2,806,131
Patented Sept. 10, 1957

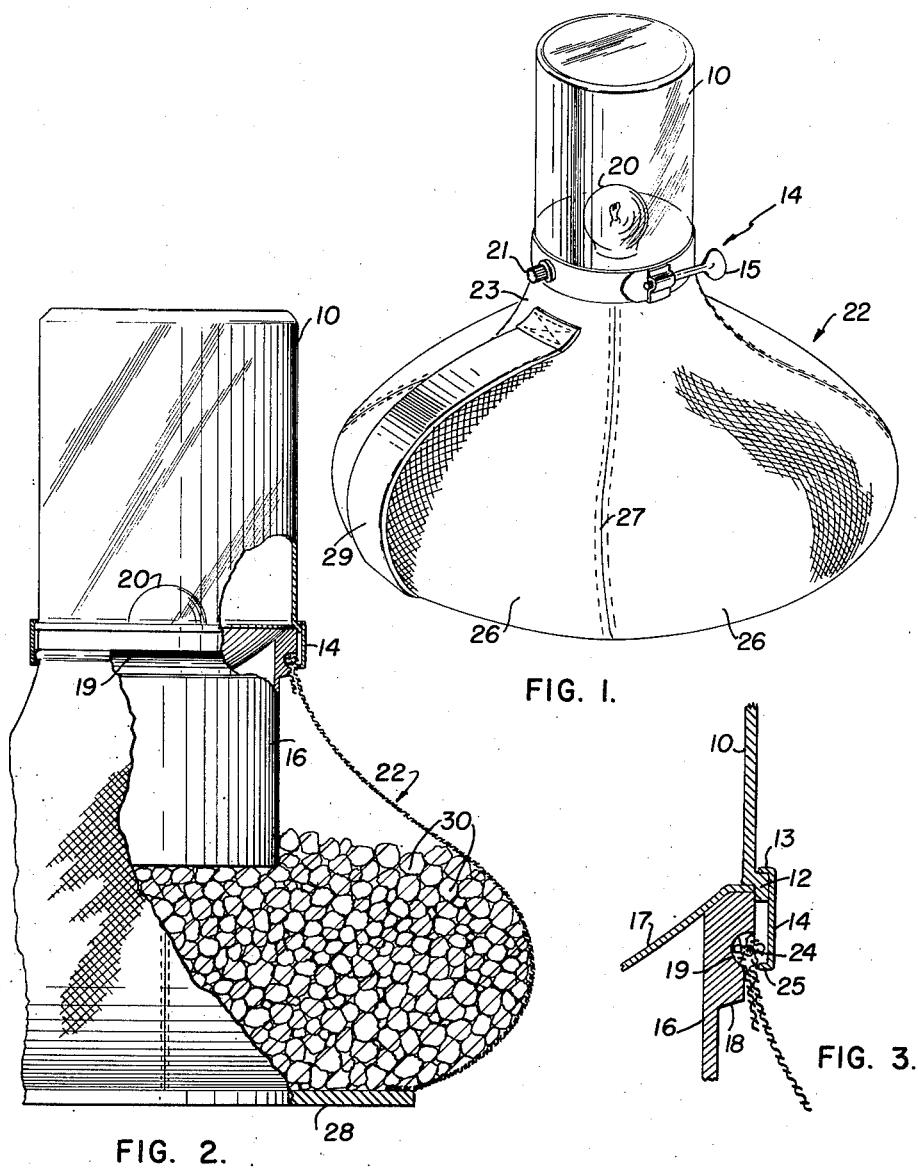

2,806,131

RUNWAY EMERGENCY LIGHTS

Samuel L. Palmer, Fort Worth, Tex.

Application February 10, 1955, Serial No. 487,298

1 Claim. (Cl. 240—1.2)

This invention relates to runway emergency lights for use along the sides of and ends of aircraft landing strips, but is also adaptable for other uses such as outlining wrecked airplanes on an airfield, or for other uses, such as along highways for indicating the presence of a stalled vehicle.

While designed primarily for military use, the invention may be used any place to indicate the presence of hazards at night to vehicles or pedestrains. The invention is particularly useful for outlining runways in newly acquired military landing strips, such as when ground forces "move up." In addition to landing strips, the lights may be employed for outlining helicopter drop areas. Additionally, the present emergency lights may be used along the runways of commercial and military landing strips when the permanently installed lights fail for one reason or the other, as when such lights are covered by snow resulting from the action of snow plows.

An object of the invention is to provide an emergency light which is safe in its use as compared with "flare pots" having open flames heretofore used for that purpose. A particular object of the invention is to provide an emergency light which may be quickly placed where desired, as by dropping one or more such lights from a moving truck.

Another object of the invention is to provide an emergency light capable of use in all climates and particularly for use in climates having sub-zero weather.

Another object is to provide a collapsible support for an electric emergency light which may be readily filled with natural ballast, such as sand, gravel, broken ice or snow available at the place of use.

A further object of the invention is to provide a dropable emergency light having a low center of gravity, and one which will tend to conform at its base with the terrain on which it falls.

These and other objects of the invention will become apparent from the following description and the accompanying drawing of an exemplary form of the invention, wherein:

Figure 1 is a perspective view of an emergency light in accordance with the invention.

Figure 2 is an enlarged broken elevation and sectional view of the light shown in Figure 1.

Figure 3 is an enlarged broken vertical sectional view of the lower periphery of the lens dome and the upper periphery of the light supporting base, together with means detachably securing the same relative to each other.

In the drawings, the numeral 10 indicates a cylindrical dome of transparent non-breakable material such as polystyrene or other synthetic resin. The lower edge of the dome 10 is provided with an outwardly formed offset shoulder 12 for engaging the inwardly formed flange 13 around the upper edge of a circular clamp 14. The clamp 14 illustrated is similar to a hose clamp such as used on automobile hose connections and may be tightened by means of a thumb screw 15. Since the clamp construction referred to is well known, the same is not herein described in detail. It is to be understood that other clamping means may be employed, such as split rings or other circular holding means.

Beneath the dome 10 there is a cylindrical receptacle 16 which receives a reflector 17 in the upper end thereof. The periphery of the reflector 17 is received in the inner offset of the shoulder 12, as shown in Figure 3. The upper outer surface of the receptacle 16 is provided with an integral shoulder 18 having a groove 19 therearound. An electric light bulb or lamp 20 is threadedly received in the center of the reflector 17 and is in contact with a dry cell which is operated by the switch 21. Generally, the dry cell and lamp construction is similar to that of a flashlight and the switch 21 is electrically connected therewith by obvious means.

The base of the illustrated form of the invention is comprised of a bag 22 having a neck 23 which fits around the receptacle shoulder 18 as shown in Figure 3. The bag 22 may be of any suitable flexible material, such as canvas, fabric nylon or flexible plastic materials such as polystyrene. The mouth of the bag 22 around the neck 23 is hemmed inwardly around a circular stiffener wire 24, and the lower inwardly directed flange 25 of the circular clamp 14 engages the bag beneath said wire.

The bag 22 is preferably made in segments shaped to provide a bag having a relatively broad base, and which segments are sewn together along their edges, as indicated at 27. A base of circular stiff material 28, such as leather, may be secured to the bottom of the bag if desired. Another optional feature is a handle strap 29 sewed at the ends thereof to the side of the bag 22.

In operation, the bags 22 may be filled with any convenient ballast 30, such as gravel, sand, crushed ice or snow and dropped from a truck at intervals along the borders to be outlined. Preferably, the dry cells of the self contained light unit are replaced from time to time to assure operability when needed in an emergency; also, the ballast should be removed when the emergency light units are not in use so as to preserve the bags 22.

The invention is not limited to the construction herein shown and described, but may be made in various ways within the scope of the appended claim.

What is claimed is:

An emergency light comprising a normally empty flexible bag, a self contained electric light unit comprising a battery housing, means supporting a light source in operative association with said housing, and a transparent cover enclosing said light source, means attaching said bag to said unit in such manner as to provide, when filled with suitable loose weights, a base for said unit, an aperture in said bag through which said weights may be inserted or removed, and means for opening said aperture to permit filling said bag.

References Cited in the file of this patent

UNITED STATES PATENTS

| 1,425,945 | Congdon | Aug. 15, 1922 |
|---|---|---|
| 1,767,087 | Metcalf | June 24, 1930 |
| 1,778,545 | Allen | Oct. 14, 1930 |
| 2,219,974 | Bellow | Oct. 29, 1940 |
| 2,450,927 | Allen | Oct. 12, 1948 |
| 2,536,533 | Cannon | Jan. 2, 1951 |